US012476562B2

(12) United States Patent
Puthan Veetil et al.

(10) Patent No.: US 12,476,562 B2
(45) Date of Patent: Nov. 18, 2025

(54) SYSTEMS AND METHODS FOR REDUNDANT OVERVOLTAGE PROTECTION FUNCTIONS

(71) Applicant: Hamilton Sundstrand Corporation, Charlotte, NC (US)

(72) Inventors: Divya Puthan Veetil, Karnataka (IN); Raghavendra D Kabade, Bangalore (IN); Sandeep Suresh Pai, Karnataka (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 209 days.

(21) Appl. No.: 18/495,853

(22) Filed: Oct. 27, 2023

(65) Prior Publication Data
US 2025/0080017 A1  Mar. 6, 2025

(30) Foreign Application Priority Data
Aug. 31, 2023  (IN) .............................. 202311058545

(51) Int. Cl.
*H02P 9/10* (2006.01)
*H02H 9/04* (2006.01)
*H02P 9/00* (2006.01)

(52) U.S. Cl.
CPC .............. *H02P 9/102* (2013.01); *H02H 9/04* (2013.01); *H02P 9/006* (2013.01)

(58) Field of Classification Search
CPC ............ H02P 9/102; H02P 9/006; H02H 9/04
See application file for complete search history.

(56) References Cited

U.S. PATENT DOCUMENTS

| 8,576,522 | B2 | 11/2013 | Beneditz et al. |
| 9,071,051 | B2 | 6/2015 | Sagona |
| 11,862,963 | B2* | 1/2024 | Sorkin .................... H02H 7/06 |
| 2007/0170974 | A1* | 7/2007 | Saman ................ H03F 3/45928 |
| | | | 327/363 |
| 2012/0106007 | A1* | 5/2012 | Beneditz ............. H02P 29/0241 |
| | | | 361/18 |

(Continued)

FOREIGN PATENT DOCUMENTS

EP  0024661 A1  3/1981

OTHER PUBLICATIONS

Extended European Search Report for EP Application No. 24188847.8; Issue Date, Jan. 7, 2025, 11 pages.

*Primary Examiner* — Scott Bauer
(74) *Attorney, Agent, or Firm* — CANTOR COLBURN LLP

(57) ABSTRACT

A power generation system includes a rotating machine having a mechanical rotational output. An electrical generator is connected to the mechanical rotational output, and has an electrical output electrically connected to a power distribution system. A generator control unit is controllably coupled to at least the electrical generator. The generator control unit includes a memory and a processor. The generator control unit is configured to operate in conjunction with an overvoltage protection unit including a redundant overvoltage operational test system. The redundant overvoltage operational test system includes an operational amplifier configured to operate as a voltage follower during a first mode of operations, and as a point of regulation gain amplifier during a redundant overvoltage operational test.

16 Claims, 1 Drawing Sheet

(56) References Cited

U.S. PATENT DOCUMENTS

| | | |
|---|---|---|
| 2012/0106009 A1 | 5/2012 | Beneditz et al. |
| 2012/0194948 A1 | 8/2012 | Patel |
| 2013/0182354 A1* | 7/2013 | Maddali ................ H02H 7/065 |
| | | 361/21 |
| 2014/0168825 A1* | 6/2014 | Patel ...................... H02P 9/102 |
| | | 361/21 |
| 2021/0399542 A1 | 12/2021 | Sorkin et al. |
| 2022/0003801 A1 | 1/2022 | Feucht et al. |

* cited by examiner

SYSTEMS AND METHODS FOR REDUNDANT OVERVOLTAGE PROTECTION FUNCTIONS

CROSS-REFERENCE TO RELATED APPLICATIONS

This application claims the benefit of Indian Provisional Application No. 202311058545 filed Aug. 31, 2023, the disclosure of which is incorporated herein by reference in its entirety.

BACKGROUND

Exemplary embodiments pertain to the art of generator controls and specifically to methods and systems for redundant overvoltage protection (ROV protection) for the same.

Rotating machines frequently generate excess rotation beyond the mechanical needs of a corresponding system. The excess rotation may be provided to electrical generators and converted into electrical power. In alternative examples, a primary function of the rotating machine is to create input rotation to a generator to provide the electrical power. In both cases, it may be desirable to protect the electrical system from overvoltages that may occur for any number of reasons. Generator operations are typically controlled by a generator control unit, which can be in the form of a dedicated controller, general controller, distributed control system, or the like. Apart from the generator control unit, there is also an overvoltage protection unit that performs redundant overvoltage protection of the generator.

Overvoltage Protection Units (OPUs) provide redundant overvoltage protection and other redundant protection functions in conjunction with the Generator Control Unit (GCU) for Electric Power Generation Systems (EPGS). The OPU has a Redundant Overvoltage (ROV) protection function to isolate the generator when the Point of Regulation (POR) voltage exceeds the overvoltage envelope defined by either an inverse time curve or a fixed voltage/time value. A test of this system, referred to as a redundant overvoltage operational test, is typically carried out at every power up sequence to verify the proper operation of the redundant overvoltage trip circuit. The test involves generating multiple point of regulation voltage values, and determining whether an overvoltage trip occurs as per the protection limit curve depending on the point of regulation value.

To verify the redundant overvoltage protection limit curve during the operational test, point of regulation voltage must be regulated at different voltage values. It is desirable to include a method to efficiently regulate the point of regulation voltage during the redundant overvoltage operational test.

BRIEF DESCRIPTION

Disclosed are power generation systems includes a rotating machine including a mechanical rotational output configured to output mechanical rotation, an electrical generator including a mechanical rotational input connected to the mechanical rotational output, and an electrical output electrically connected to a power distribution system, a generator control unit controllably coupled to at least the electrical generator, the generator control unit including a memory and a processor, the generator control unit is configured to operate in conjunction with an overvoltage protection unit including a redundant overvoltage operational test system, and wherein the redundant overvoltage operational test system comprises an operational amplifier configured to operate as a voltage follower during a first mode of operations, and a point of regulation gain amplifier during a redundant overvoltage operational test.

In another example of the above, the power generation system includes a variable resistor connected to a negative input of the operational amplifier on a first side and connected to a switch on a second side, the switch connecting the second side to a ground when in a closed state and disconnecting the second side from the ground in an open state.

In another example of any of the above the operational amplifier is a voltage follower while the switch is open and wherein the operational amplifier is a point of regulation gain while the switch is closed.

In another example of any of the above an open/closed state of the switch and a resistance of the variable resistor is controlled by the generator control unit.

In another example of any of the above, the power generation system includes a voltage divider configured to receive a commanded point of regulation and provide an output to a positive input of the operational amplifier.

In another example of any of the above an output of the operational amplifier is provided to a rectifier, an output of the rectifier is provided to a MAX win block, and an output of the max win block is provided to a peak hold block.

In another example of any of the above an output of the peak hold block is a maximum point of regulation value, and wherein the redundant overvoltage trip circuit uses the maximum point of regulation value to evaluate a trip condition.

In another example of any of the above the point of regulation input voltage can be fixed at a nominal value which is below at most 235 volts.

Also disclosed is a method for controlling a generator including controlling a generator using a generator control unit, the generator control unit including a memory and a processor and the electric power generation system having a an overvoltage protection unit having a redundant overvoltage operational test system, placing an operational amplifier in a voltage follower mode during a first mode of generator operations, and placing the operational amplifier in a point of regulation gain amplifier mode during a redundant overvoltage operational test mode of generator operations.

In another example of any of the above wherein the redundant operational test system includes a variable resistor connected to a negative input of the operational amplifier on a first side and connected to a switch on a second side, the method further including connecting a variable resistor to a ground by placing the switch in a closed mode, and disconnecting the second side from the ground in an open state.

In another example of any of the above placing the switch in an open state causes the operational amplifier to operate as a voltage follower, and wherein placing the switch in a closed state causes the operational amplifier to operate as a point of regulation gain while the switch is closed.

In another example of any of the above an open/closed state of the switch and a resistance of the variable resistor is controlled by the generator control unit.

In another example of any of the above the method includes altering a gain of the point of regulation gain amplifier by altering a resistance of the variable resistor.

In another example of any of the above the method includes providing an output of the operational amplifier to a full wave rectifier as a scaled down point of regulation output, providing a rectified scaled down point of regulation value to a MAX win block to a peak hold block and outputting a maximum point of regulation value from the peak hold block.

In another example of any of the above an output of the peak hold block is a maximum point of regulation value, and wherein the redundant overvoltage trip circuit uses the maximum point of regulation value to evaluate a trip condition.

In another example of any of the above the method includes maintaining a point of regulation input voltage to the sense circuit below at most 235 volts.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

Figure 1:
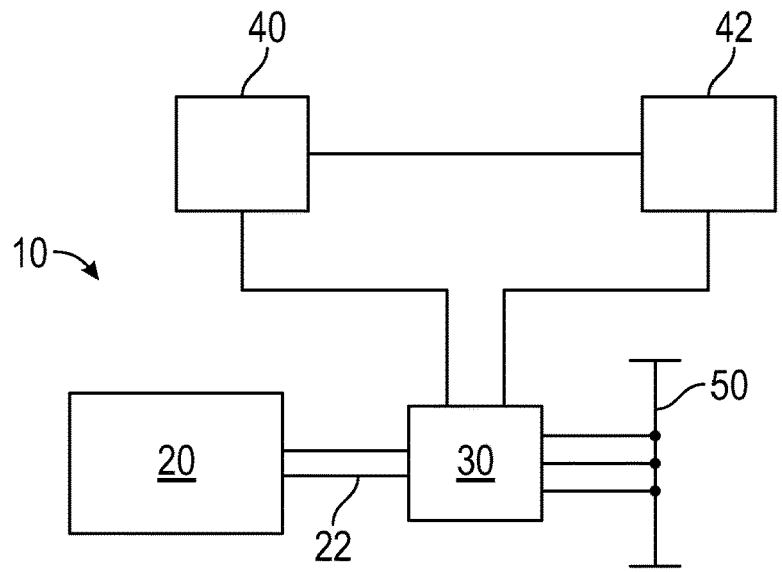
FIG. 1 is a high level block diagram of power generation system.
Figure 2:
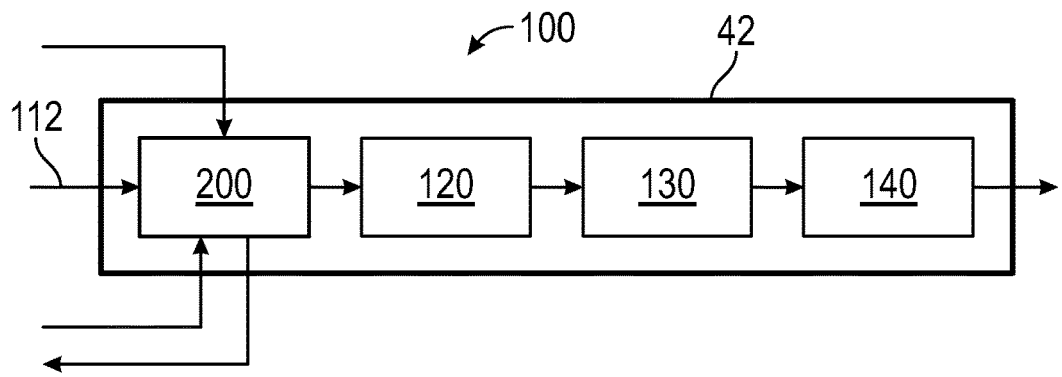
FIG. 2 is a part of the redundant overvoltage protection system which senses point of regulation voltage.

FIG. 1 illustrates a high level block diagram of power generation system 10 including a mechanical rotation system 20, such as a gas powered turbine. The mechanical rotation system 20 includes a rotational output 22 that is mechanically connected to a rotational input of an electrical generator 30. The operations of the generator 30 are controlled by a generator control unit 40. The generator control unit 40 can be a single dedicated controller including a microprocessor and a memory, a module within a general controller for a larger control system, a combination of control processes distributed across multiple system controllers, or any similar control architecture configured to implement generator control processes. The electrical power output from the generator 30 is provided to a power distribution system 50 that distributes the power to any number of systems. Apart from the generator control unit 40, there is also an overvoltage protection unit 42 present in the electric power generation system. The overvoltage protection unit 42 includes a redundant overvoltage trip circuit that generates an overvoltage trip signal when the point of regulation voltage exceeds the limits as defined in the redundant overvoltage protection limit curve. The sense circuit which provides the peak value of point of regulation voltage for the overvoltage trip circuit to evaluate is illustrated in FIG. 2. The point of regulation sense circuit along with the redundant overvoltage trip circuit is configured to test the point of regulation overvoltage protection function of the overvoltage protection unit during each startup of the generator 30.

In existing overvoltage protection unit designs, during an operational test of the redundant overvoltage systems multiple point of regulation voltages are generated and compared to the overvoltage envelope. To evaluate various trip conditions, closed loop regulation of point of regulation voltage is utilized wherein the generator control unit microcontroller commands the Voltage Regulation digital signal processor (VR DSP) to increase the exciter current command thus incrementing the point of regulation voltage.

In the existing redundant overvoltage operational test, the generator control unit sets a voltage reference set point to regulate the point of regulation voltage to a particular value (lower than the overvoltage threshold). After resetting the overvoltage protection unit, the generator control unit applies excitation to the generator. A gain signal is applied by the generator control unit microcontroller in the point of regulation sense circuit to increase the point of regulation voltage. The gain signal enables a GAIN 2X block in the point of regulation sense circuit thereby increasing the gain of point of regulation sense circuit by a predetermined amount. The gain factor is dependent on the particular implementation of the generator control unit and is determined using conventional systems in the art. This multiplies the point of regulation voltage to a much higher value.

After a time (T1) the generator control unit checks for any redundant overvoltage trip which may or may not have been triggered by the higher point of regulation voltage (post gain). The time T1 allows for a voltage buildup to just reach the boundary of an overvoltage protection unit redundant overvoltage inverse time curve. This is a 'may trip' condition check. After a second time T2, the point of regulation voltage is expected to cause an overvoltage trip. The generator control unit evaluates this must trip condition by confirming that the redundant overvoltage trip has happened at the end of T2. This process is repeated for multiple reference set points of point of regulation. The generator control unit 40 evaluates whether the redundant overvoltage protection system is functioning properly by identifying at which points a may trip and a must trip condition is expected and determine if the corresponding trips are detected. When all expected trips are detected, the test is passed.

In practice the requirement to generate large output point of regulation voltage each time, as needed to meet the must trip requirement, can be exhaustive, and can require additional circuitry within the overvoltage protection unit 42 to achieve the desired levels.

FIG. 2 illustrates a modified redundant overvoltage operational test sequence for use in the overvoltage protection module 42 using a new amplifier circuit design which allows for a reduction in overall steps and circuitry by applying the gain to a nominal point of regulation voltage (e.g. no more than 235 volts) thereby keeping the higher voltages entirely within the test system. The modified redundant overvoltage operational test sequence simplifies the operational test by keeping the actual point of regulation voltage at a nominal value and varying the point of regulation voltage levels inside of the overvoltage protection unit 42 to various trip conditions of the redundant overvoltage protection. Keeping the point of regulation voltage levels inside the overvoltage protection unit 42 is achieved using a modification in the overvoltage protection unit 42 redundant overvoltage protection hardware circuit (See FIG. 3) and a modification within generator control unit 40 software.

In the modified sequence of FIG. 2, initially the overvoltage protection unit 42 receives a point of regulation three phase AC input 112 value. This block includes a voltage divider where each point of regulation phase voltage is scaled down. Each of these scaled down output voltage is passed through a non-inverting amplifier with a programmable resistor. The GCU controls the programmable resistor value thereby controlling the gain to the desired value. Thus, the GCU can vary the point of regulation voltage. The varied three phase point of regulation voltage is provided to a full wave rectifier block 120, where each of the three phase AC point of regulation voltage values are rectified into DC signals. The DC signals are provided to a MAX win block 130, which outputs the maximum of the rectified voltage values. Finally the value is provided to a peak hold block 140, which outputs the peak value of the point of regulation to the redundant overvoltage trip circuit. The redundant overvoltage trip circuit uses this peak value to evaluate trip conditions.

Figure 3:
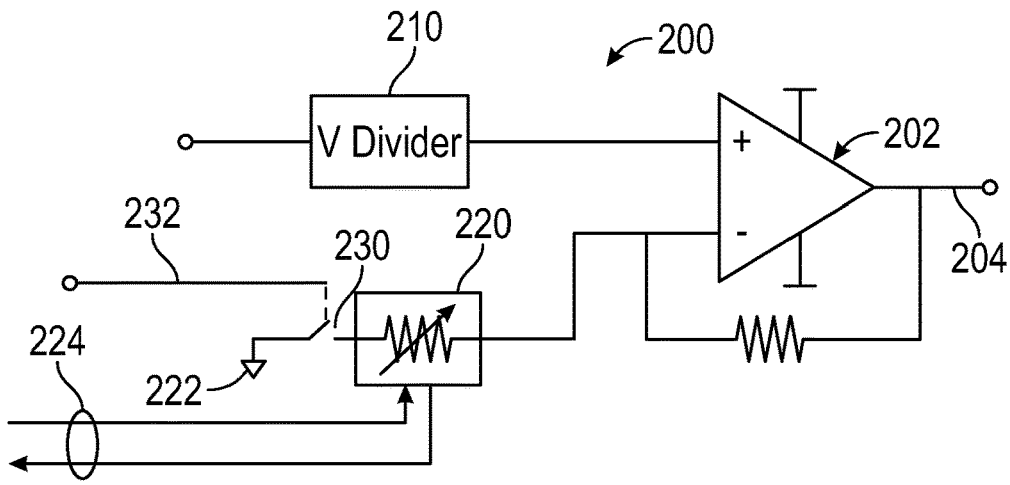
FIG. 3 is an exemplary circuit for utilization in the point of regulation sense block within the redundant overvoltage protection system of FIG. 2

The modified test sequence 100 reduces the circuitry required for the operational test by combining the gain and the scaling down functions into a single circuit (shown in FIG. 3). The gain function is a new design which replaces existing unity gain amplifiers in the scale down block. This allows the GAIN 2X block to be removed from the point of regulation sense circuit.

The combined scale down function and gain function of FIG. 3 utilizes a non-inverting amplifier 200 circuit (illustrated in FIG. 3) using an operational amplifier 202. The positive input of the operational amplifier 202 is provided from a voltage divider 210. A programmable resistor 220 provides an input to the negative input of the operational amplifier 202, and the resistance of the programmable resistor 220 is set by the generator control unit 40. The specific resistance of the programmable resistor 220 determines the gain of the operational amplifier 202, thereby allowing the generator control unit 40 to generate different point of regulation voltage level equivalents at the operational amplifier 202 output 204 by altering the resistance of the programmable resistor 220.

A switch 230 is connected in series with the programmable resistor 220. The switch 230 alters a working mode of the operational amplifier 202 from amplifier to voltage follower during normal operating conditions by opening the path that connects the programmable resistor 220 to ground 222. A control signal 232 generated by a microcontroller within the generator control unit is used to control the state of the switch 230. Shifting the gain functions to the operational amplifier 202 merges the gain step with the scale down step at the front of the process, thereby reducing circuitry, and allowing the actual point of regulation voltage to be maintained at a nominal voltage.

During normal operating conditions the switch 230 is kept open and the operational amplifier 202 behaves as a voltage follower. However, during operational test conditions (e.g., when the generator control unit 40 operates the redundant overvoltage operational test), the switch 230 is closed using the signal 232 from the generator control unit 40 and the resistance of the resistor 220 is set using SPI inputs 224 which are also provided by the generator control unit 40, and the value is set to various values and the sequence is run at each value to test the trip condition according to a predefined redundant overvoltage protection limit curve. Throughout the process, at predefined intervals, the generator control unit 40 checks for an overvoltage trip. The response at each interval can be set within the generator control unit 40. In a typical example, the response is either a may trip condition or a must trip condition.

In some examples, the generator 30 output may be varied to different voltage levels to carry out the redundant overvoltage operational test. Throughout this process, the point of regulation voltage is maintained at a nominal value. In some examples, the nominal value may be a value around 235 Vrms L-N. The combination of the operational amplifier 202 and the programmable resistor 220 allows for the point of regulation voltage to be varied internally to the overvoltage protection unit with the operational amplifier 202 being able to be operated as a voltage follower during normal operations. Thus, during the operational test, the point of regulation voltage can be quickly set to different trip voltages as per the protection limit curve and the generator control unit only needs to wait for the overvoltage trip to happen to check for the status.

Further, as the point of regulation voltage level can be varied to different levels just before the full wave rectifier stage 120, the change in point of regulation for the test may happen only within the overvoltage protection unit.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A power generation system comprising:
   a rotating machine including a mechanical rotational output configured to output mechanical rotation;
   an electrical generator including a mechanical rotational input connected to the mechanical rotational output, and an electrical output electrically connected to a power distribution system;
   a generator control unit controllably coupled to at least the electrical generator, the generator control unit including a memory and a processor, the generator control unit being configured to operate in conjunction with an overvoltage protection unit including a redundant overvoltage operational test system; and
   wherein the redundant overvoltage operational test system comprises an operational amplifier configured to operate as a voltage follower during a first mode of operations, and a point of regulation gain amplifier during a redundant overvoltage operational test.

2. The power generation system of claim 1, further comprising a variable resistor connected to a negative input of the operational amplifier on a first side and connected to a switch on a second side, the switch connecting the second side to a ground when in a closed state and disconnecting the second side from the ground in an open state.

3. The power generation system of claim 2, wherein the operational amplifier is a voltage follower while the switch is open and wherein the operational amplifier is a point of regulation gain while the switch is closed.

4. The power generation system of claim 2, wherein an open/closed state of the switch and a resistance of the variable resistor is controlled by the generator control unit.

5. The power generation system of claim 2, further comprising a voltage divider configured to receive a commanded point of regulation and provide an output to a positive input of the operational amplifier.

6. The power generation system of claim 2, wherein an output of the operational amplifier is provided to a rectifier, an output of the rectifier is provided to a MAX win block, and an output of the max win block is provided to a peak hold block.

7. The power generation system of claim 6, wherein an output of the peak hold block is a maximum point of regulation value, and wherein the redundant overvoltage trip circuit uses the maximum point of regulation value to evaluate a trip condition.

8. The power generation system of claim 2, wherein the point of regulation input voltage can be fixed at a nominal value which is below at most 235 volts.

9. A method for controlling a generator comprising:
controlling a generator using a generator control unit, the generator control unit including a memory and a processor and the electric power generation system having an overvoltage protection unit having a redundant overvoltage operational test system;
placing an operational amplifier in a voltage follower mode during a first mode of generator operations; and
placing the operational amplifier in a point of regulation gain amplifier mode during a redundant overvoltage operational test mode of generator operations.

10. The method of claim 9, wherein the redundant operational test system includes a variable resistor connected to a negative input of the operational amplifier on a first side and connected to a switch on a second side, the method further comprising:
connecting a variable resistor to a ground by placing the switch in a closed mode, and disconnecting the second side from the ground in an open state.

11. The method of claim 10, wherein placing the switch in an open state causes the operational amplifier to operate as a voltage follower, and wherein placing the switch in a closed state causes the operational amplifier to operate as a point of regulation gain while the switch is closed.

12. The method of claim 10, wherein an open/closed state of the switch and a resistance of the variable resistor is controlled by the generator control unit.

13. The method of claim 10, further comprising altering a gain of the point of regulation gain amplifier by altering a resistance of the variable resistor.

14. The method of claim 10, further comprising providing an output of the operational amplifier to a full wave rectifier as a scaled down point of regulation output, providing a rectified scaled down point of regulation value to a MAX win block to a peak hold block and outputting a maximum point of regulation value from the peak hold block.

15. The method of claim 14, wherein an output of the peak hold block is a maximum point of regulation value, and wherein the redundant overvoltage trip circuit uses the maximum point of regulation value to evaluate a trip condition.

16. The method of claim 10, further comprising maintaining a point of regulation input voltage to the sense circuit below at most 235 volts.

* * * * *